(12) United States Patent
Li et al.

(10) Patent No.: US 7,125,122 B2
(45) Date of Patent: *Oct. 24, 2006

(54) PROJECTION SYSTEM WITH CORRECTIVE IMAGE TRANSFORMATION

(75) Inventors: Baoxin Li, Vancouver, WA (US); Shigeru Kojima, Tochigi Prof. (JP); Toshinori Furuhashi, Tochigi Pref. (JP); Kazuya Arakawa, Tochigi Pref. (JP); Ryohichi Yonezawa, Tochigi Pref. (JP)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/770,591

(22) Filed: Feb. 2, 2004

(65) Prior Publication Data

US 2005/0168705 A1 Aug. 4, 2005

(51) Int. Cl.
*G03B 21/00* (2006.01)
*G03B 21/14* (2006.01)

(52) U.S. Cl. .................... 353/31; 353/69; 353/70; 353/101; 353/121

(58) Field of Classification Search .......... 353/30, 353/31, 69, 70, 101, 121; 349/5, 7, 8; 348/744, 348/748; 345/748

See application file for complete search history.

(56) References Cited

U.S. PATENT DOCUMENTS

| | | | |
|---|---|---|---|
| 5,548,357 A | 8/1996 | Appel et al. | 353/69 |
| 5,795,046 A | 8/1998 | Woo | 353/69 |
| 6,044,177 A | 3/2000 | Herley | 382/233 |
| 6,115,503 A | 9/2000 | Kaup | 382/268 |
| 6,191,827 B1 | 2/2001 | Segman et al. | 348/746 |
| 6,361,171 B1 | 3/2002 | Ejiri et al. | |
| 6,367,933 B1 | 4/2002 | Chen et al. | 353/69 |
| 6,416,186 B1* | 7/2002 | Nakamura | 353/69 |
| 6,431,711 B1 | 8/2002 | Pinhanez | 353/69 |
| 6,520,647 B1 | 2/2003 | Raskar | 353/70 |
| 6,592,228 B1* | 7/2003 | Kawashima et al. | 353/101 |
| 6,598,978 B1 | 7/2003 | Hasegawa | 353/42 |
| 6,609,797 B1* | 8/2003 | Ejiri et al. | 353/69 |
| 6,700,669 B1 | 3/2004 | Geng | 356/603 |
| 6,704,000 B1 | 3/2004 | Carpenter | 345/158 |
| 6,753,907 B1 | 6/2004 | Sukthankar et al. | 348/222.1 |
| 6,846,081 B1 | 1/2005 | Mochizuki et al. | 353/70 |
| 6,877,864 B1* | 4/2005 | Tamura et al. | 353/70 |
| 6,886,946 B1* | 5/2005 | Eguchi | 353/101 |
| 6,974,217 B1* | 12/2005 | Kimura et al. | 353/69 |

(Continued)

FOREIGN PATENT DOCUMENTS

JP   3-120526   5/1991

(Continued)

OTHER PUBLICATIONS

Sukthankar, Rahul,, Stockton, Robert G., Mullin, Matthew D., "Smarter Presentations: Exploiting Homography in Camera-Proejctor System," articles appears in Proceedings of Internation Conference on Computer Vision, 2001 and consists of 7 pages.

(Continued)

*Primary Examiner*—Melissa Jan Koval
(74) *Attorney, Agent, or Firm*—Chernoff, Vilhauer, McClung & Stenzel

(57) ABSTRACT

An image projection system that corrects an image to be projected onto a projection surface by sensing at least a portion of that surface, and based upon the sensed portion, determining and applying a corrective transformation to the image, after which the corrected image is projected onto the projection surface.

4 Claims, 16 Drawing Sheets

U.S. PATENT DOCUMENTS

| | | |
|---|---|---|
| 2003/0043303 A1 | 3/2003 | Karuta et al. ................ 348/744 |
| 2004/0041985 A1 | 3/2004 | Kimura et al. ................ 353/70 |
| 2004/0061838 A1 | 4/2004 | Mochizuki et al. ........... 353/69 |

FOREIGN PATENT DOCUMENTS

| | | |
|---|---|---|
| JP | 08201913 A | 8/1996 |
| JP | 09326981 A | 12/1997 |
| JP | 10200836 A | 7/1998 |
| JP | 2000222554 A | 8/2000 |
| JP | 2002071315 A | 3/2002 |
| JP | 2002247614 A | 8/2002 |
| JP | 2003168103 A | 6/2003 |
| JP | 2003348498 A | 12/2003 |
| JP | 2003348500 A | 12/2003 |
| JP | 2005-016943 | 1/2005 |
| JP | 2005077993 A | 3/2005 |
| JP | 2005-518732 A | 6/2005 |
| WO | WO02/33889 A2 | 10/2000 |

OTHER PUBLICATIONS

Raskar, Ramesh and Beardsley, Paul, "A Self Correction Projector," IEEE Computer Vision and Pattern Recognition (CVPR) 2001, Hawaii, Dec. 2001, consisting of 5 pages.

* cited by examiner

Spectrum

Spectrum

Focused Image

Out-of-focus Image (b)

An image of the screen from the projector's perspective. The line is assumed to be the one row that the 1-D sensor can sense.

(b)

The luminance values of the row in (a), illustrating that working in the luminance domain there may be no region that is uniform (and thus is potential screen area).

(c)

The gradient of (b).

Based on the similarity of the triangles, the distance $L$ is computed as a function of the sensor parameters ($B$ and $f$) and the disparity $\Delta X$ (difference between the two images of the same physical point):

$$L = \frac{Bf}{\Delta X}$$

PROJECTION SYSTEM WITH CORRECTIVE IMAGE TRANSFORMATION

BACKGROUND OF THE INVENTION

This invention relates generally to image projectors, and more particularly, to modifying projected images.

Portable digital image projectors are common. Such digital image projectors, while connected to a personal computer or other image/video source, sit on a surface and are directed at a projection surface to show a "slide" presentation or a video presentation. Many of these projectors use transmissive or reflective liquid crystal displays, and typically only have a single main lens. Other such projectors use different imaging devices, such as digital micro-mirrors, and may include more than one lens. The projectors can display images one at the time or as a sequence of images, as in the case of video.

These digital projectors are typically designed so that undistorted rectangular images are projected on the projection surface when the projector is placed horizontally on a level support surface with the projector's optical axis lined up perpendicular to the projection surface. However, if the alignment and orientation is modified, then the resulting image on the projection surface may be distorted. In many cases the image will appear as a trapezoid, and in other cases an arbitrarily shaped quadrilateral. The non-rectangular shape of the resulting projected image is referred to as keystoning.

One technique to adjust for keystoning is to tediously adjust the physical position of the projector by moving it around, tilting and rotating it, until a near rectangular image is displayed. However, in many situations, it may not be feasible to sufficiently physically adjust the position of the projector. For example, the projector may need to be positioned above or below the display surface for proper image presentation.

U.S. Pat. No. 5,548,357, entitled "Keystoning and focus correction for an overhead projector," describes a system where a test slide is displayed. A user then identifies line pairs that appear to be parallel to each other. The user identified line pair activates a distortion correction program that uses the oblique angle between the horizontal plane through the projector and the viewing screen. This is a burdensome task for a user to correctly perform.

U.S. Pat. No. 5,795,046, entitled "Method for pre-compensating an asymmetrical picture in a projection system for displaying a picture," describe a system where the projection angle, and the trapezoidal error, is compensated for by the user entering positional information into the system via a keyboard. The determination and inputting of positional information is difficult and burdensome for the user.

United States Patent Publication 2002/0021418 A1, entitled "Automatic Keystone Correction For Projectors With Arbitrary Orientation", describes a projection system that includes a pair of tilt sensors and a camera. The system using data from the tilt sensors and the camera warps the projected image to display an image that is rectangular. Unfortunately, the tilt sensors tend to be expensive and the system requires complex re-calibration when the projector lens moves, e.g., when the projector is zoomed and/or focused. This inherent complexity increases the expense of the resulting projector.

DETAILED DESCRIPTION OF THE PREFERRED EMBODIMENT

Figure 1:
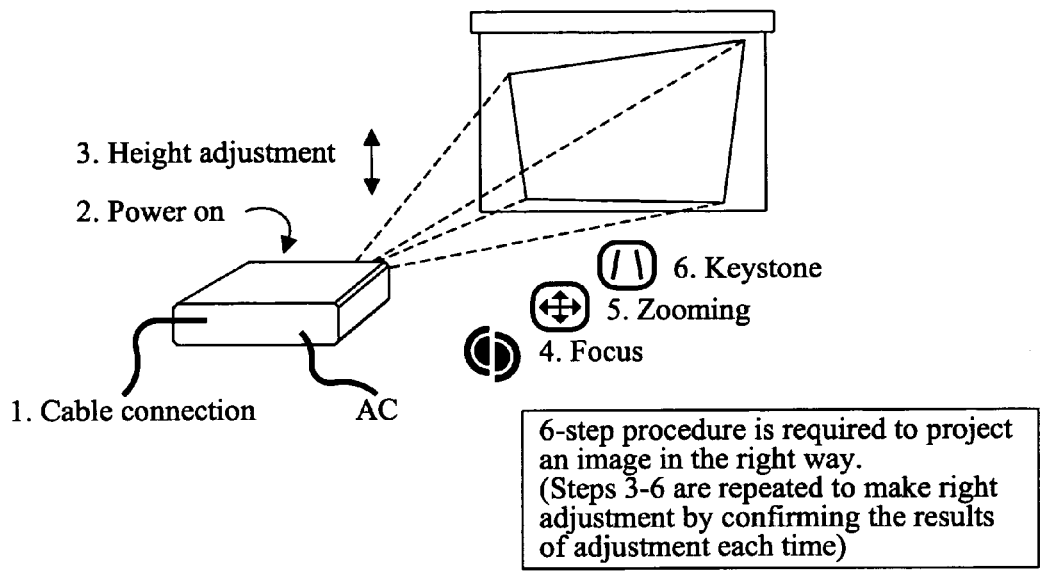
FIG. 1 is an existing projection system.
Figure 2:
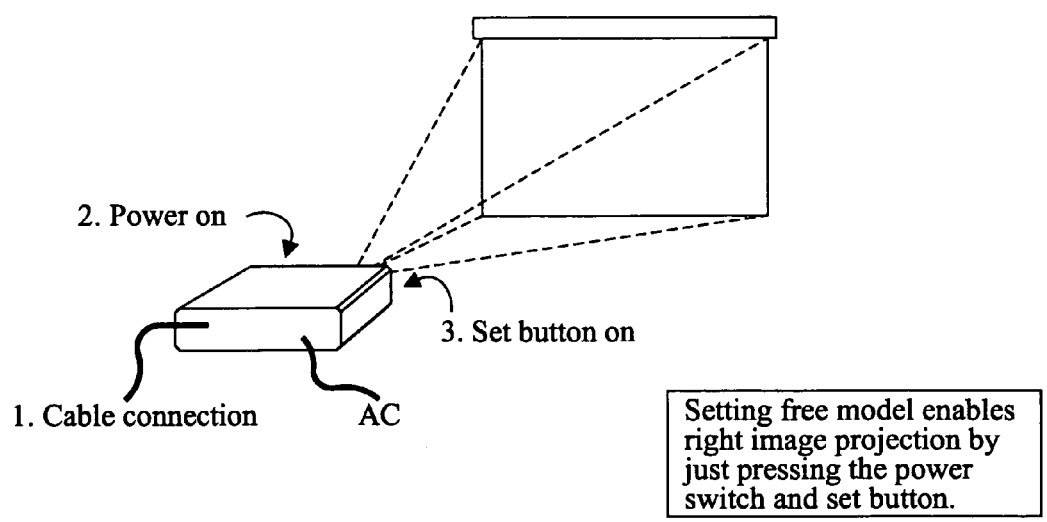
FIG. 2 is a modified projection system.

Referring to FIG. 1, a typical projection system includes an enclosure housing the electronics and imaging devices. To set up a projector to display an image properly many steps are performed which typically include, (1) connecting a cable to a laptop or other image source, (2) switching a power switch (on/off), (3) adjusting the vertical angle of projection, (4) focusing the image on the display, (5) adjusting the zoom of the image, and (6) manually adjusting the keystone. As it may be observed, this includes many steps which typically need to be performed in a suitable order. Referring to FIG. 2, a modified projection system includes an enclosure housing the electronics and imaging devices. To set up the modified projector to display an image properly fewer steps are performed which typically include, (1) connecting a cable to a laptop or other image source, (2) switching a power switch (on/off), and (3) selecting the auto-set up function. As it may be observed this requires considerably fewer operations and is less likely to be performed in an improper manner. A more automated projector system provides convenience to users who enjoy the flexibility of more freely positioning the projector within rooms with varying dimensions and facilities.

Figure 3:
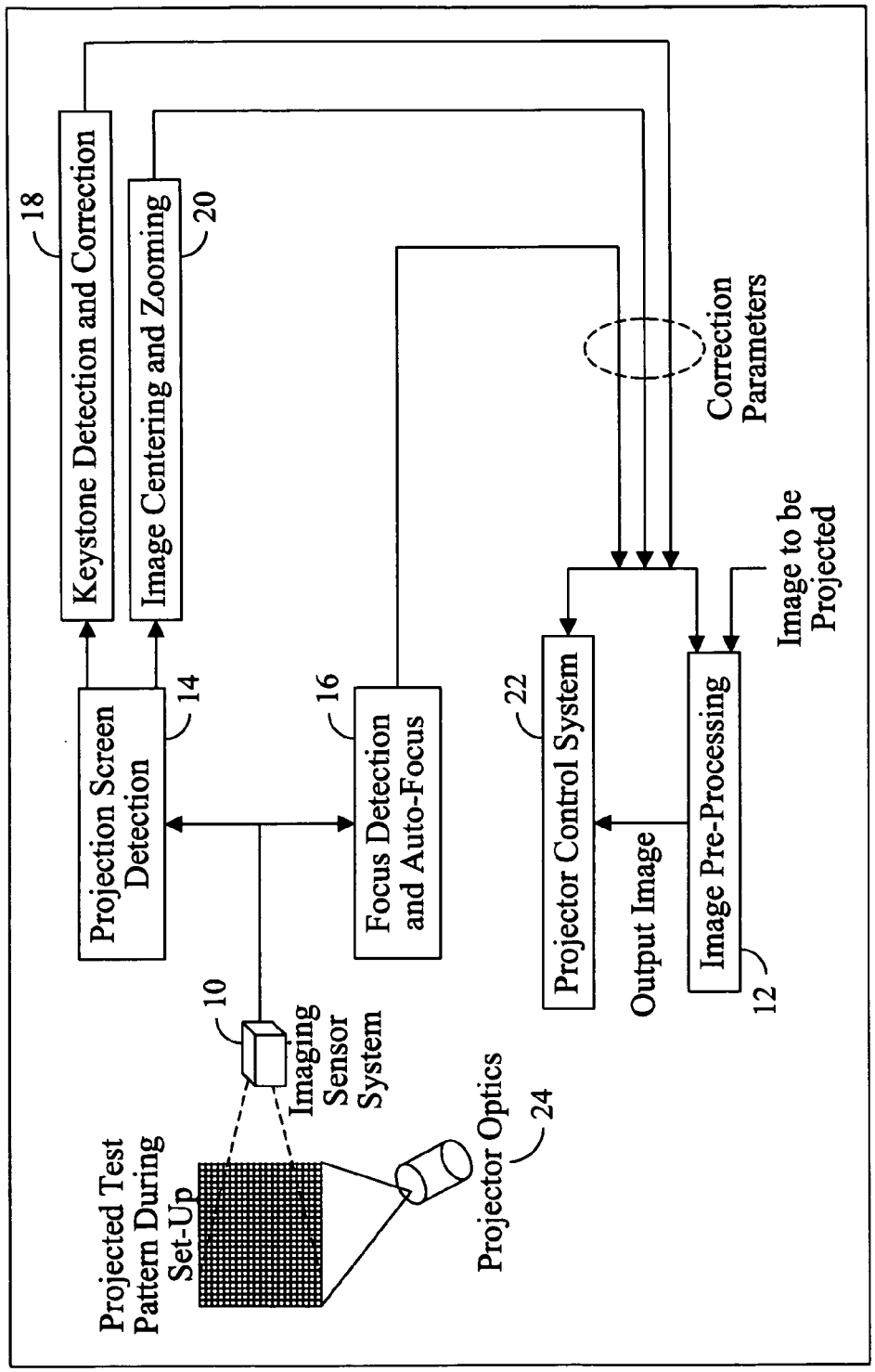
FIG. 3 illustrates a self adjusting projection system.

Referring to FIG. 3, the primary components of a self-adjusting (setting-free) projector include an imaging sensor system 10, an image pre-processing module 12, projection screen detection module 14, focus detection and auto-focus module 16, keystone detection and correction module 18, image centering and zooming module 20, projector control system 22, and projector optical and mechanical components 24.

The projection process of a projector may be modeled by an abstraction, that is, the projection process may be a mapping of an image from the projector onto a projection plane outside the projector (e.g., a screen or a wall). This mapping may be approximated by a transformation function $f_P$ of an ideal thin lens model. Also, the imaging process of the sensing device may be described by a transformation function $t_C$ of an ideal lens model. It is to be understood that other models may likewise be used, as desired. The following description referring to the optical axis may be of the ideal lens model. The models and optical axis may likewise reference the actual optical axis of any part of the system. In many cases, when the projector's optical axis is not orthogonal with respect to the projector plane a keystone distortion will occur. That is, the typical rectangular image from the projector will be projected as a non-rectangular quadrilateral on the projection plane. In some cases, the imaging and optics may project a keystoned image when projected in the orthogonal direction which may be adjusted to a non-keystoned image (or otherwise the keystoning is reduced).

Figure 17:
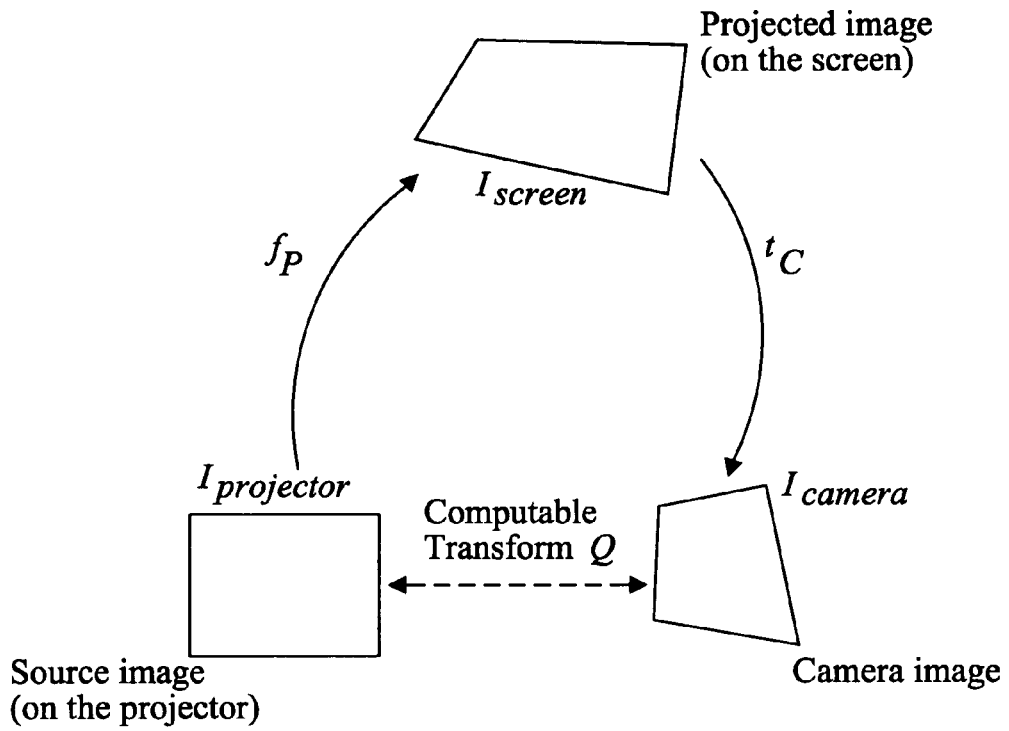
FIG. 17 illustrates relationships between parts of the projection system.

Referring to FIG. 17, the relationship between the screen, camera, and projector may be expressed as:

$I_{SCREEN} = f_P (I_{PROJECTOR})$
$I_{CAMERA} = t_C (I_{SCREEN})$
$I_{CAMERA} = Q(I_{PROJECTOR})$

In an orthogonal projection case (keytone-distortion free), the transformation $f_P$ may be a scaling transformation, e.g., $f_P = sU$, where U is an identity transformation and s is a scale factor. Otherwise, the image should be modified by a transformation $P_P = (f_P)^{-1}$, where "=" refers to "equals to up to a scale factor".

The imaging sensor system 10 may contain one or more imaging sensors, or imaging sensor pairs forming a stereo pair. Individual imaging sensors may be one-dimensional or two-dimensional sensors. The imaging sensors may also include the projector optics, such as the projection lens. In the case of a pair of sensors, the relative angular deviation between the surface onto which the image is projected and the image plane of the projector may be used as the basis of image modification, such as keystoning. Also, in the case of multiple sensors, the angular deviation between them may be used as the basis of the image modification, such as keystoning. It is noted that a vertical tilt sensor may be included, if desired.

Figure 4:
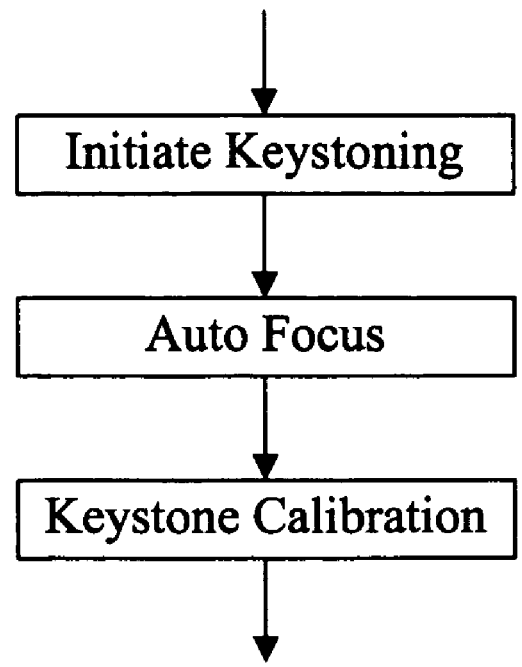
FIG. 4 illustrates keystone correction with autofocus.
Figure 8:
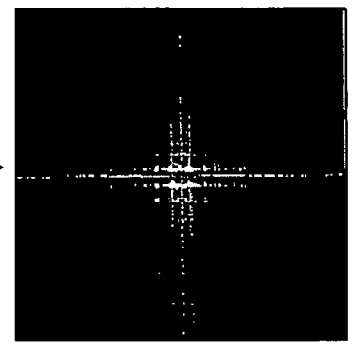
FIG. 8 shows the spectrum of FIG. 5.
Figure 7:
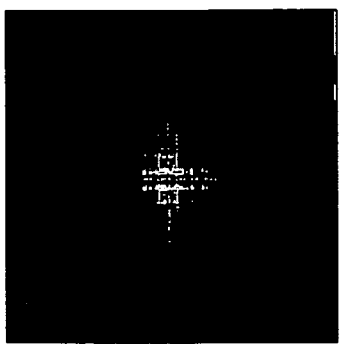
FIG. 7 shows the spectrum of FIG. 6.
Figure 5:
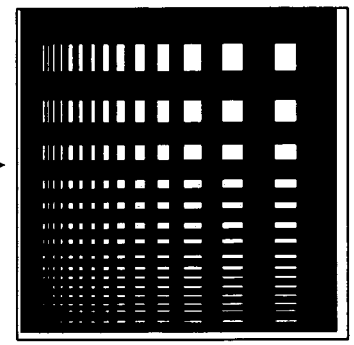
FIG. 5 shows a focused image.
Figure 6:
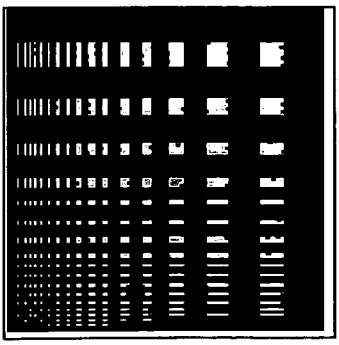
FIG. 6 shows an out of focus image

The present inventors considered the projector system of United States Patent Publication 2002/0021418 A1, entitled "Automatic Keystone Correction For Projectors With Arbitrary Orientation", described above, and determined that occasionally the projector system will fail to properly keystone compensate. After considering the inability to properly keystone compensate the present inventors came to the realization that such a potential failure is, at least in part, the result of the projector being sufficiently out of focus. In many cases, the user will tend to manually focus the projector prior to keystoning which will alleviate the concern. However, in other cases the user will consider the projector sufficiently focused for their current needs and will attempt to keystone correct the image without success, thus resulting in frustration to the user. For example, a projected test pattern that is severely out of focus may result in inadequate keystone parameter detection. Referring to FIG. 4, to overcome this previously unconsidered limitation, the system preferably auto-focuses prior to keystone correction. While any number of different auto-focus mechanisms may be used, the system preferably uses an appropriate test pattern to determine whether or not the projector is in focus (see FIG. 5). In the event the system is not properly focused (see FIG. 6), an iterative process where the amount of de-focus is determined, the lens is focused, the amount of de-focus is determined, the lens is focused, etc. is undertaken. One technique for determining the amount of de-focus is to use the frequency spectrum of the image of the projected test pattern (see FIG. 7) and compare it with a reference frequency spectrum (see FIG. 8) of the image of the test pattern acquired when the projector is properly focused. Other de-focus (or focus) detection, determination, and adjustment mechanisms may likewise be utilized, as desired. After performing an auto-focus of the projection system, then the system applies a keystone compensation. It is also noted that keystone modifications may be based upon part of an image, if desired.

In one embodiment, the keystone compensation may be manually performed by the user after automatic auto focus. In another embodiment, the keystone compensation may be automatically performed by the system after automatic auto focus. In yet another embodiment, the keystone compensation may be partially manual and partially automatically performed after automatic auto focus. The auto-focus function should be invoked by the system as a result of activating or otherwise performing the keystone compensation. The activation of the auto-focus function, as applied to keystone compensation, should be in a manner free from separate user selection of the otherwise existing auto-focus function of the projector. In this manner, the focus of the system is ensured prior to completion of the keystone correction.

The present inventors further considered the projector system described in R. Sukthankar et al., "Smarter Presentations: Exploiting Homography In Camera-Projector Systems," IEEE ICCV Conference, 2001, described above, and determined that while the use of the single camera can be used to estimate the parameters of the keystone effect, however, there is no guarantee that the projected image after keystone correction maintains the correct aspect ratio. In particular, the system needs to compute C. This is performed by detecting the four screen corners in the image domain, the four physical screen corners, and then solve for C. Unless the physical screen happens to have the same aspect ratio as the screen the system can not obtain the correct aspect ratio. To overcome such a limitation the present inventors determined that interactivity with the user and the projection system can overcome such aspect ratio limitations.

Figure 9:
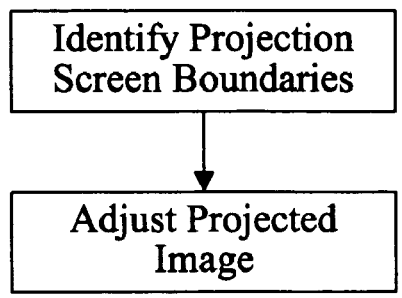
FIG. 9 illustrates image adjustment in accordance with screen size.

Referring to FIG. 9, the corners of the projection screen may be identified, such as the upper left corner, the upper right corner, the lower left corner, and the lower right corner. With all four corners identified, or at least a pair of diagonal corners identified, the aspect ratio of the projection screen may be determined. Alternatively, the system could detect the edges of the projection screen and from that determine the general boundaries of the projection screen. In any case, the identification of one or more aspects of the projection screen indicating a region that is suitable for displaying an image on, or otherwise the exterior boundary of the projection screen, will be referred to as a boundary. In many cases, the aspect ratio of the projection screen is similar to the desired aspect ratio of the projected image. In some cases, only the upper or lower corners of the projection screen are detected, in which case, the width of the projection screen may be used as the basis to predict a typical aspect ratio of the screen, such as a 4:3 aspect ratio. In a similar manner, the vertical edges of the projection screen may likewise be used. In some cases, only the right or left corners of the projection screen are detected, in which case, the height of the projection screen may be used as the basis to predict a typical aspect ratio of the screen, such as a 4:3 aspect ratio. In a similar manner, the horizontal edges of the projection screen may likewise be used.

The projected image, such as using a test pattern, is sensed by the camera and compared with the size of the projection screen. Most preferably, two, three, or four corners of the projected quadrilateral region are used to characterize the projected test pattern characteristics. This may be done by comparing the four corners of the projected test pattern with the four corners (or otherwise) of the detected projection screen. Then, adjustments to the projected image may be made to shift the edges of the projected image in accordance with the projection screen. The sensing of the projected image by the camera and resizing the projected image may be repeated until the desired size (horizontal and/or vertical) and/or aspect ratio of the projected image is achieved. For example, if the projection is to the left of the screen, the screen detection module may sense such an alignment and output a set of control parameters to cause the projector to shift towards the right-hand side. The edges of the image and projection screen may likewise be used. In one embodiment, the control parameters may be the distance between the mass centers of the projection screen and the projected image. The system may use any suitable relationship between the projected image and the size of the projection screen. For example, the image may be centered on the projection screen and sized to fit approximately 90% of the projection screen. For example, if the projection is larger than the detected screen, then the projector may zoom in; and if the projection is smaller than the detected screen, then the projector may zoom out. In this manner, the system may perform auto-zoom and/or auto-centering functions to align the image. In addition, if the auto-zoom and/or auto-centering functions are performed prior to making adjustments for the keystone effects, then the projector may make more efficient use of the projector's imaging panel, and thus provide a higher quality image, when performing warping (such as digitally). In contrast, if the keystoning is performed on a smaller region of the image of the projector's imaging panel then significant image quality may be lost.

Figure 21:
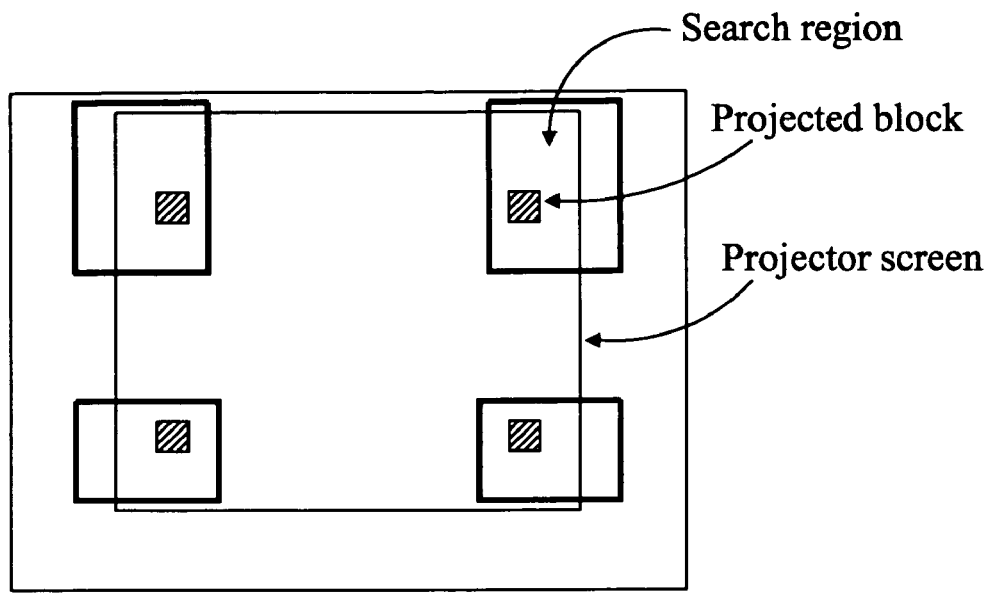
FIG. 21 illustrates test blocks of a test pattern.
Figure 22:
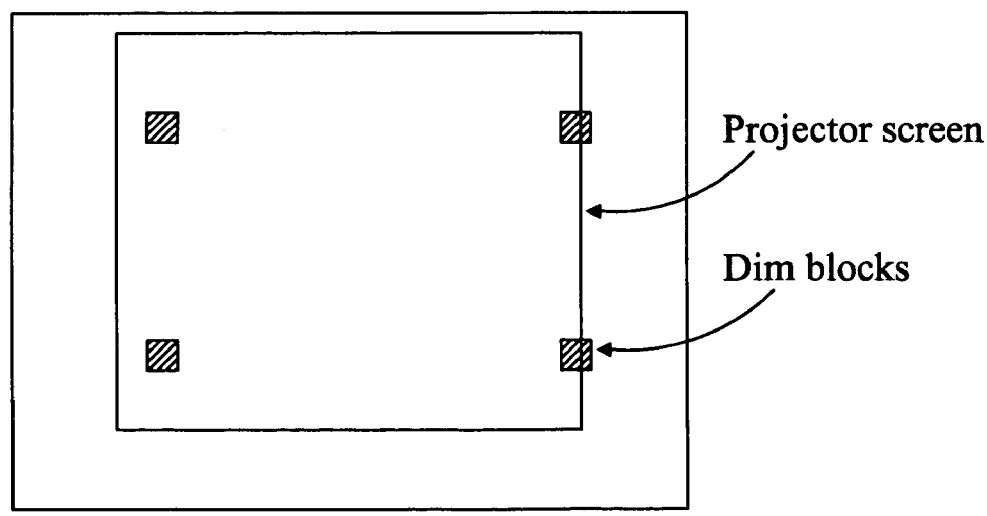
FIG. 22 illustrates faded test blocks of a test pattern.

Referring to FIG. 21, another suitable test pattern includes four blocks on the projector's four corners so that the system then performs a block detection. In some cases the blocks may be very dim due to ambient light, as illustrated in FIG. 22, or the blocks may fall onto a black screen boundary. Accordingly, reliably detecting such patterns may be difficult. To alleviate these issues the processing techniques should include limiting the search region and using small test areas. Each of the test regions preferably includes less than 10 percent of the total area of the image, and preferably less than 5 percent of the total area of the image. Also, the total of the test regions preferably includes less than 40%, 30% of the total area of the image, and preferably less than 20 percent or 10 percent of the total area of the image.

Figure 23:
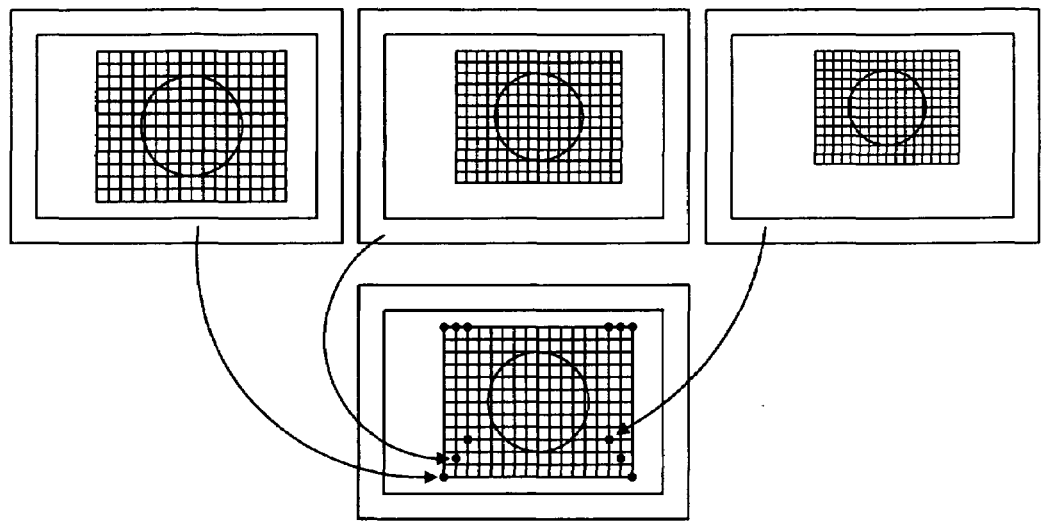
FIG. 23 illustrates the trajectory that arises from fixed relationships.

The relationship between the domains of the projector, screen, and camera are governed by the transformations previously described. Due to the fixed relationship between the camera and lens, given a projector-to-screen distance with a projection angle, a camera image of a point in the projector domain will follow a fixed trajectory where the projector lens being zoomed from one end to another (provided no lens shift occurs). This effect is illustrated in FIG. 23. The trajectory may vary when the projector-to-screen distance and/or if the projection angle changes. To reduce such distance and angle changes the optical axis of the camera may be aligned closely with the optical axis of the projector, with one proximate one another. The distance is preferably less than 5 inches, and preferably less than 3 inches. A suitable angle is preferably less than 15 degrees, more preferably less than 10 degrees, and more preferably less than 5 degrees. This results in the transformation Q being close to a scale factor. Therefore, variations in the trajectories of a point with zooming becomes relatively minor for most applications. Also, with such limited variations the necessary search area for the projected test pattern is reduced.

If the projector has lens shifting ability then that may be incorporated into the system. It is noted that lens shifting is normally quite limited so that effect is still to significantly reduce the search region. Also, a distance sensor, such an infra-red beam, may be used to determine the distance. The measured distance may then be used in the keystoning operations.

As illustrated in FIG. 22, one of the reasons for difficulty in detecting the projected test pattern is that the patterns fall outside of the white screen region. In most cases it is desirable to have the image projected within the white screen region. With the screen detection module the system is aware of where the screen boundaries are so the projector may be controlled to project the test pattern within the boundaries of the screen.

To avoid having to locate patterns that may be outside of the screen boundaries, the system preferably includes a pattern that is centrally located within the projector domain, and thus is likely to be on the screen. The pattern may be, for example, at least 20 percent distant from the edges of the image in the projector domain (e.g., 20 percent distant from each edge relative to the width in the relevant direction). With the small image of the test pattern sensed, the system can calculated the locations of the edges of the projected image, and thus scale, shift, zoom, and un-keystone the image appropriate, as illustrated in FIG. 23.

Figure 27:
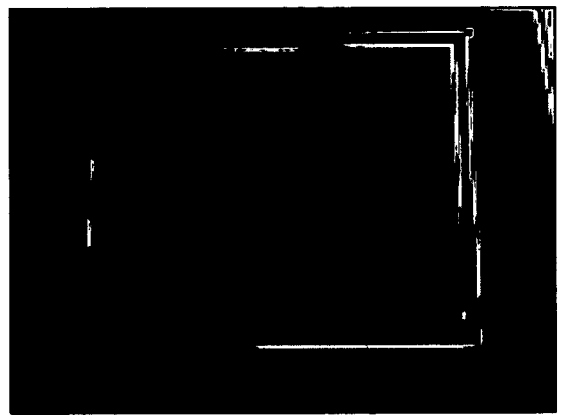
FIG. 27 illustrates wide angle lens distortion.
Figure 28:
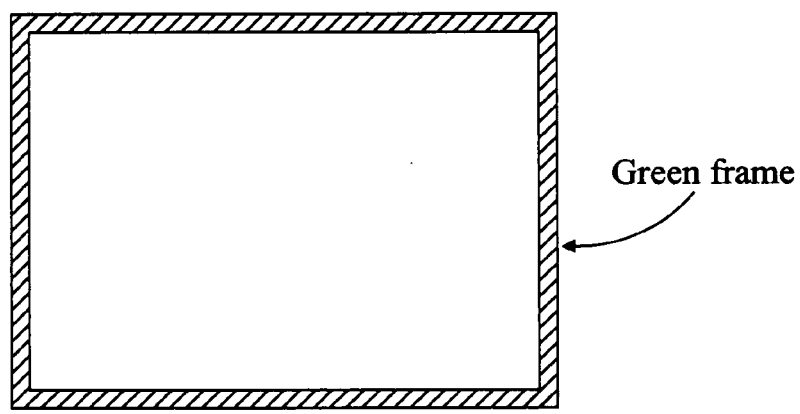
FIG. 28 illustrates a green frame.
Figure 29:
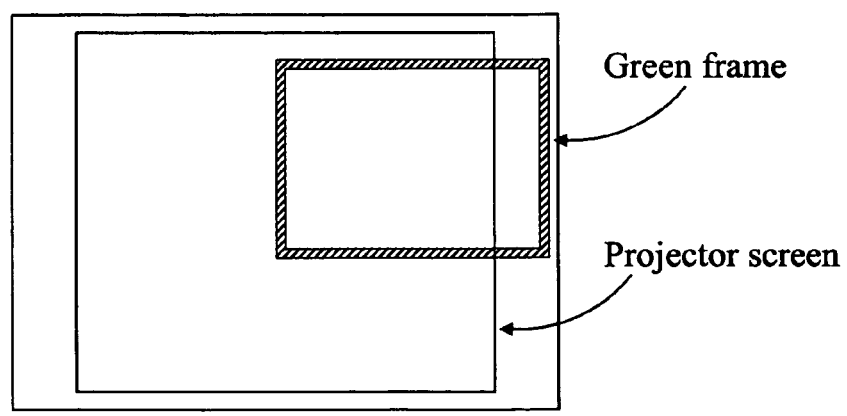
FIG. 29 illustrates a green frame in a captured image.

Another exemplary technique for projection detection includes using a colored rectangular frame, such as green, as the test pattern. The colored rectangular frame should be substantially equal to the size of the projector's imaging panel, and accordingly the outside corners substantially correspond to the corner points of the projector's imaging panel. This is illustrated in FIG. 27 where the exterior rectangle is green as the test pattern with the remainder of the test pattern being off. Using a substantially green color provides at least two benefits: i) in most office environment, the background (typically part of a wall) contains little green material, so a green pattern is easy to detect in most circumstances; and ii) the color green contributes most to the brightness of the projection, compared with for example the color blue; thus the visibility of a green pattern is better than other single-colored patterns, especially in face of not-so-dim ambient light. Next the system needs to actually detect the green frame in the captured image, as illustrated in FIG. 28.

Since the green frame is similar to a black frame of a screen, it has been determined that the projected green frame tends to interfere with distinguishing the screen boundaries. To overcome the difficulty of distinguishing the screen boundaries from the green color, the system may include a modified detection technique that exploits the fact that with fixed camera-projector relationships, the four sides of the green pattern will lie within some fixed ranges that can be measured (the same general idea as illustrated in FIG. 23). Consequently, the detection step may be modified and outlined as follows. For the 1-D technique as an example, a search range is determined for each of the four sides of the green frame. Within each search range, a 1-D algorithm is applied but with the following additional features: the detection of a boundary point is done first using the color information (since the pattern is green), and then refined locally by using the brightness information. After the 1-D detection step, as in the case of screen detection, the system may use line-fitting to integrate the individual points. At this stage, to provide a more robust line-fitting technique: when the camera is located close to the projector's optical axis, the projected green frame appears to be nearly rectangular in the camera domain. In particular, theoretically, if the camera's optical axis coincides with the effective optical axis of the projector, then the camera should always see an undistorted green frame. This together with the removal of outliers, if desired, enables the system to remove unlikely candidates from the 1-D step.

The technique, as described, uses a green test pattern of the projector's full resolution. As previously discussed, using a small pattern has advantages. Another exemplary detection technique uses a small frame pattern as the test pattern (e.g., the solid rectangle in FIG. 23). Since the projection detection is done after the detection of the screen, the system should project a pattern only within the screen. Alternatively, the system can project a small pattern and request a user to set the projector so that the pattern is within the screen. (In this case, it is similar to the "Smiley Face" approach, discussed herein). In any case, the system may reasonably assume that the projected pattern is always within the screen. With this constraint, the system may simplify the test pattern to be colorless, since now the system knows the pattern will be within the screen (typically white and uniform) and the system does not need to worry about the confusion due to the background. Consequently, this exemplary technique may include the following three major steps: 1) Based on the screen detection results, determine the quadrilateral within which the projection detection is to be done; 2) Use a technique to detect the projected pattern within the quadrilateral computed in the previous step; 3) Use a technique to determine the virtual full-resolution projection from the actually detected small pattern. For example, the image that is to be positioned on the projection screen should occupy less than 50 percent of the image, preferably less than 30 percent of the image, and preferably less than 20 percent of the image.

Another exemplary technique may be as follows.

Step 1. In the domain of the projector's imaging panel, denote the a small rectangular pattern by $I_{s\_pj}$, and the biggest rectangle by $I_{b\_pj}$, where $T_0(I_{s\_pj})=I_{b\_pj}$, where $T_0$ is a selected transformation (e.g. a pure scale transformation by a factor of 2). In practice, $T_0$ can be determined according to the detected screen size and location, so that $I_{s\_pj}$ can be kept well inside the detected screen Step 2. In the camera domain, detect the image $I_{s\_cm}$ of $I_{s\_pj}$.

Step 3. Construct a small rectangle $Q_s$ of the same aspect ratio as that of $I_{s\_pj}$.

Step 4. Compute the transformation $T_1$, between $I_{s\_cm}$ and $Q_s$ such that $I_{s\_cm}=T_1(Q_s)$.

Step 5. Construct a big rectangle $Q_b$ as follows:

$$Q_b=T_0(Q_s).$$

Step 6. Compute the virtual image $I_{b\_cm}$ of $I_{b\_pj}$ as follows:

$$I_{b\_cm}=T_1(Q_b)$$

Figure 10:
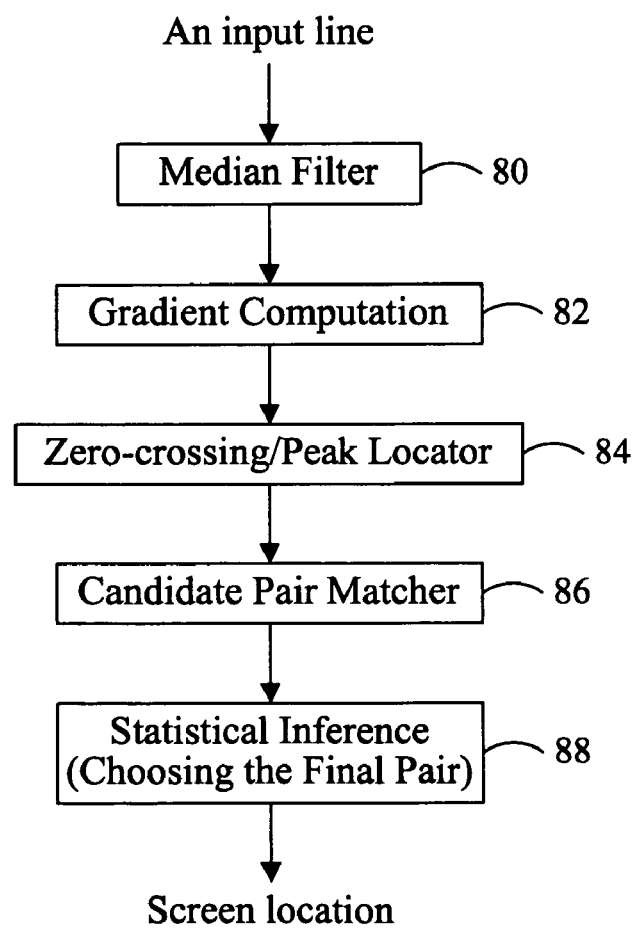
FIG. 10 illustrates image filtering.
Figure 11:
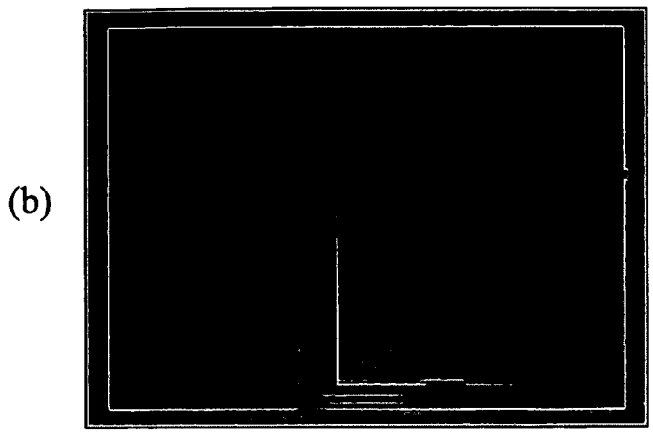
FIG. 11 illustrates a captured image.
Figure 11:
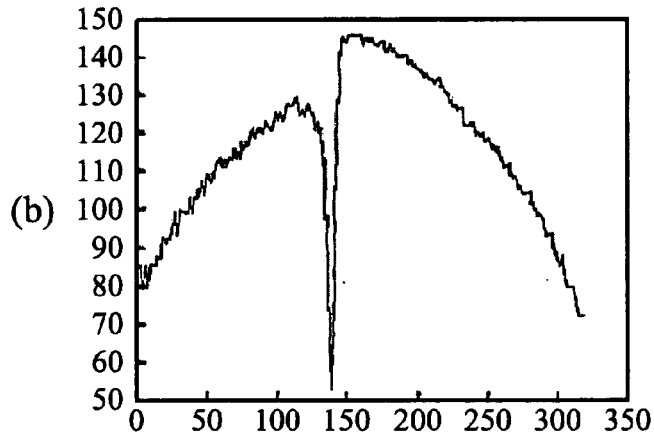
Figure 11:
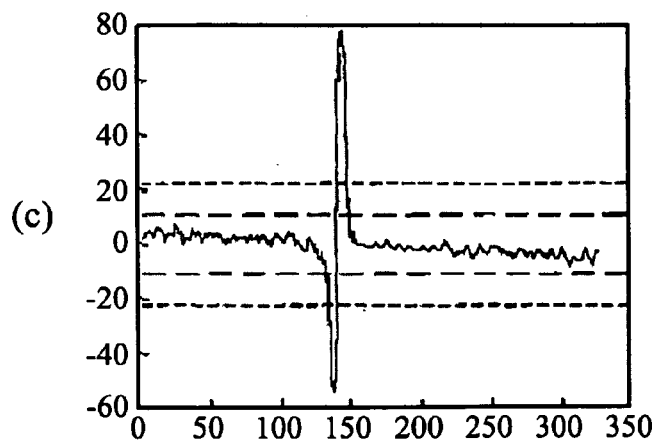

Referring to FIG. 10, one technique to detect the projection screen is to use a one-dimensional imaging sensor. An input data line is median-filtered 80 to remove noise since a typical inexpensive sensor captures data with significant noise level. The median filter is preferred due to its property of preserving discontinuity. The filtered data is then passed into a gradient computation module 82. It is noted that absolute luminance level is not the most reliable cue for identifying a screen, since there may be luminance variations due to shadows/shades as illustrated in FIG. 11. Thus the detection is preferably performed in the gradient domain. After the gradients are found, a zero-crossing/peak locator module 84 locates the zero-crossings and peaks in the gradient array. The zero-crossing/peaks are presumably the boundaries of the screen. Since typically there are multiple zero-crossings/peaks, and not all of them correspond to valid screen boundaries, the candidate pair matcher module 86 matches two zero-crossings/peaks to form a pair that is a plausible candidate of screen. The match may be based on multiple criteria such as width of the screen, average brightness of the screen, etc. This module will obtain multiple such pairs. A statistical inference module 88 uses an inference algorithm to choose the most plausible pair, based on empirical probabilities that reflect the importance of each type of the cues used. Also, the technique may be applied in both directions (e.g., two different directions, not necessarily orthogonal).

The basic principles of the above approach can be extended to the 2-D sensor case where the input array is 2-dimensional. In fact, one can even use the above 1-D approach to process the sensed 2-D array row by row, and then column by column. However, one approach will also utilize the additional 2-D constraints such as that all 1-D screen boundaries in the horizontal direction should form two lines in the vertical direction. Alternatively, with 2-D data, one can start with edge detection, then perform line detection, and then extract a quadrilateral that encloses an area of relatively uniform color (white) and typically relatively brighter than the background. It is noted that the projection screen may be identified with one or more cameras.

Figure 18:
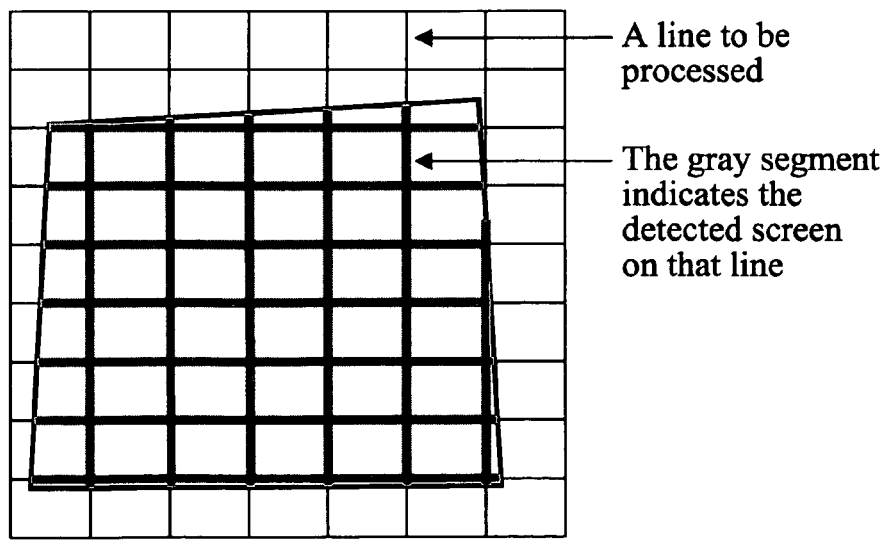
FIG. 18 illustrates 1-D detection.
Figure 19:
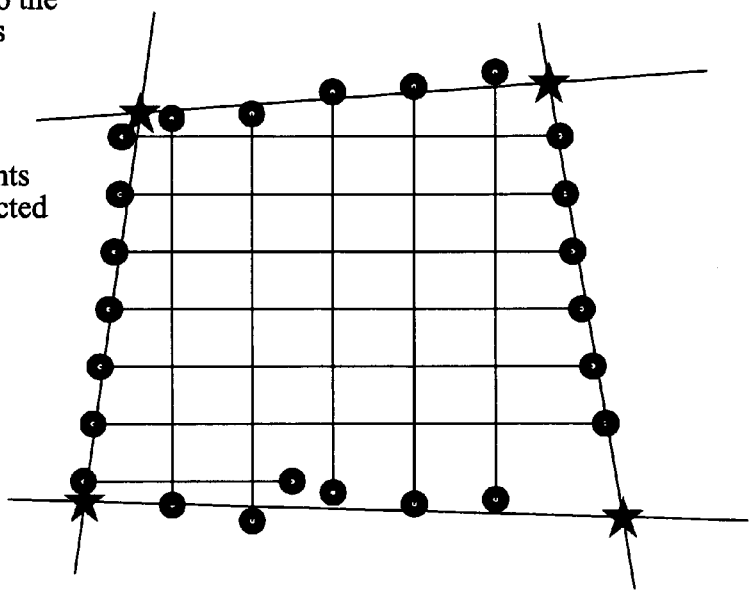
FIG. 19 illustrates 2-D line fitting from 1-D results.

One technique for screen detection is based upon line-by-line processing of selected rows and/or columns of the input image from the sensor. The sensor may capture an entire image as a frame or otherwise sense the image in a line-by-line (row and/or column) manner. The use of a line-by-line manner of data processing reduces the computational requirements of the projection system. Referring to FIG. 18, the system may process a set of selected rows and selected columns. The use of only a subset of the potentially available data reduces the computational requirements. Each of the selected rows and/or columns may use a suitable screen detection technique to locate the approximate edge of the projection screen. With a set of two different detection directions, the approximate corners of the projections screen may be estimated by integrating or otherwise summing the data from each direction into a line and determining the intersections of the lines, as illustrated in FIG. 19. It is noted that a ling-by-line processing technique requires less memory, by avoiding the need to store a full frame image (or less than ½ a full frame image), and using line fitting to determine the corners tends to be more robust than direct corner detection using two-dimensional techniques.

Another technique involves using a two-dimensional data set and performing an edge detection, then based upon the edges fitting a line to selected edges. The lines may be used to identify the corners of the projection screen. The lines may also be used as the basis to identify a quadrilateral region that encloses an area of relatively uniform color (e.g., white) on a background that is relatively darker.

Figure 20:
FIG. 20 illustrates line fitting.

Referring again to FIG. 19, the lines may be fitted to the detected end points. As a processing step the system may discard end pointes from line segments that are detached or otherwise do not intersect all the other segments. Detached segments are typically erroneous due to uniform and bright regions in the background. Referring to FIG. 20, any suitable technique may be used for fitting, such as a least squared error technique. Also, outliers may be discarded in the fitting, if desired. For example, in FIG. 20 the fourth point may be considered an outlier and excluded. In addition, the screen boundaries may be used to form additional constraints to eliminate outliers.

After the detection of the projection screen an interactive technique may be used to permit the user to further adjust the aspect ratio, and/or keystone, if desired. These techniques may likewise be used to over-ride the automatic adjustments and also provide proper operation when the range of operation for the automatic methods is exceeded (e.g., in a very dark room). Such techniques should require minimal user interaction for ease of use. A "keystone adjustment pattern" is projected which the user interacts with via the laser pointer (or otherwise a pointing device) that is integrated with the projector remote control or separate from the projector, or alternatively by selecting the appropriate functions on the projector. The user starts and stops interactive adjustment on the basis of visual feedback by observing the dynamically changing shape of the keystone correction pattern in response to user's actions. In addition, after detection of the projection screen the system may, if desired, perform auto focus, auto centering (positioning), auto zooming, and auto keystoning, all without further user interaction with the projector. Also, after detection of the projection screen the system may perform auto centering (positioning) and/or auto zooming.

Figure 12:
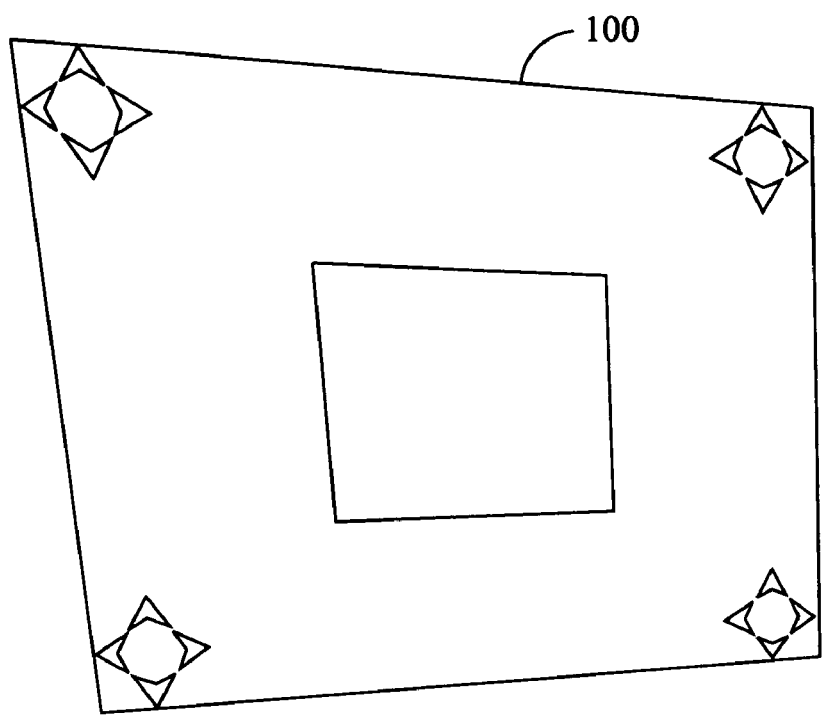
FIG. 12 shows an interactive keystone adjustment.

Referring to FIG. 12 a rectangular pattern may be used for interactive adjustment in the preferred embodiment. The pattern will appear as warped rectangle 100 when the keystone effect is present, and will appear to be perfectly (or substantially) rectangular when the keystone effect is corrected. At each one of its corners, the pattern has a cluster of 4 arrows, pointing north, south, west, and east directions. In one possible implementation, the user first enters the keystone adjustment mode by selecting the corresponding option in an on-screen menu, and then uses the laser pointer to adjust for keystone: whenever the laser beam falls on an arrow, the projection will be adjusted towards that direction. The camera detects the position of the laser and invokes the correction mechanism, which may be in the form of digital image pre-processing and/or optical/ mechanical control of the projector imaging system. The laser pointer may be integrated into the projector remote control or otherwise be separate.

Figure 13:
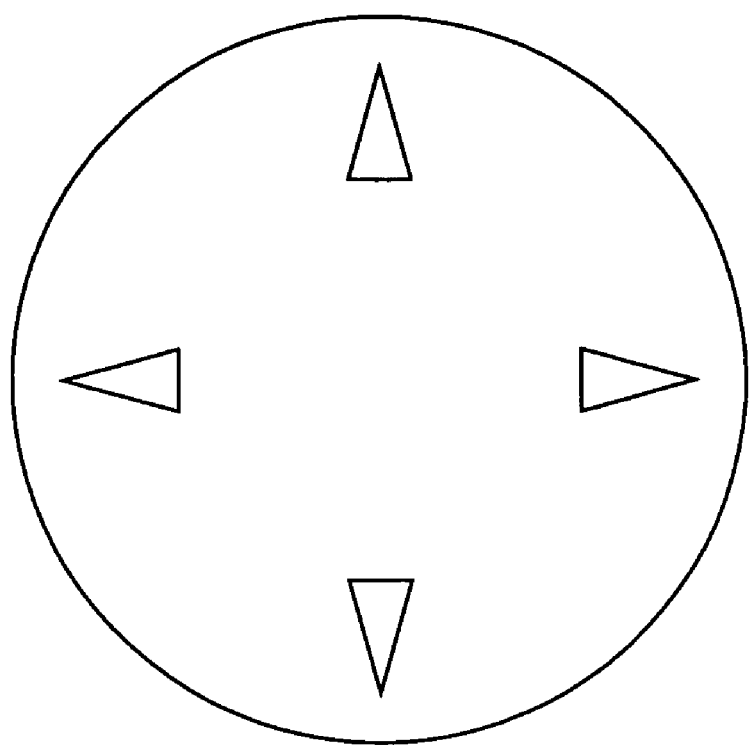
FIG. 13 shows a keypad.

In the preferred implementation, the user interacts with the arrows using the remote control unit of the projector, in particular using four-directional (pointing at N, S, W, and E) navigation arrows on a typical remote control, e.g., those on a circular directional pad. Such an ensemble of four arrows placed on a circular pad that can be pressed in 4 different directions is depicted in FIG. 13.

In this implementation, the user first enters the keystone adjustment mode by selecting the corresponding option on the on-screen display menu. The keystone adjustment pattern is then projected. Prior to adjustment, the user first selects one of the four corners that will be adjusted. There are many possible ways of making this selection. For example, the user makes a selection by pressing/clicking on a button on the remote control, or on a soft button on the on-screen display (henceforth the SELECT button). As the user presses the SELECT button, the four-arrow cluster appears on one particular corner signaling the fact that the corner is selected for adjustment. The user then selects any one of the four directions by pressing on the four corresponding directional arrows on the directional pad on the remote control unit (FIG. 13). After the adjustment is completed, when the user presses/clicks on the SELECT button, the next corner is selected. This is signaled to the user by the appearance of the four-arrow cluster at the next selected corner. By pressing the SELECT button repeatedly, the user can jump from one corner to the next in clockwise fashion. When a corner is selected, the four-arrow cluster appears on that corner to provide visual confirmation to the user. The remaining three corners do not have the four-arrow cluster.

A similar paradigm to the one described above can be used for interactive aspect ratio adjustment. Two arrows (up and down or left and right) placed on any appropriate part of the adjustment pattern are used to stretch and squeeze the image to interactively adjust for the correct aspect ratio.

In many cases there is no projection screen or otherwise a wall with discernable boundaries that is used to display the image on. In this case, it is problematic to use a single imaging device in order to provide effective keystone correction. Accordingly, the system may use two or more imaging devices, such as two or more cameras, or one or more cameras together with the projector's optical system. The pair of optical sensing devices may be used to estimate the relative horizontal deviation angle and vertical deviation angle, typically using a projected test pattern which is sensed, from which the keystone correction parameters may be estimated. For example, the test pattern may be a checkerboard pattern.

Figure 14:
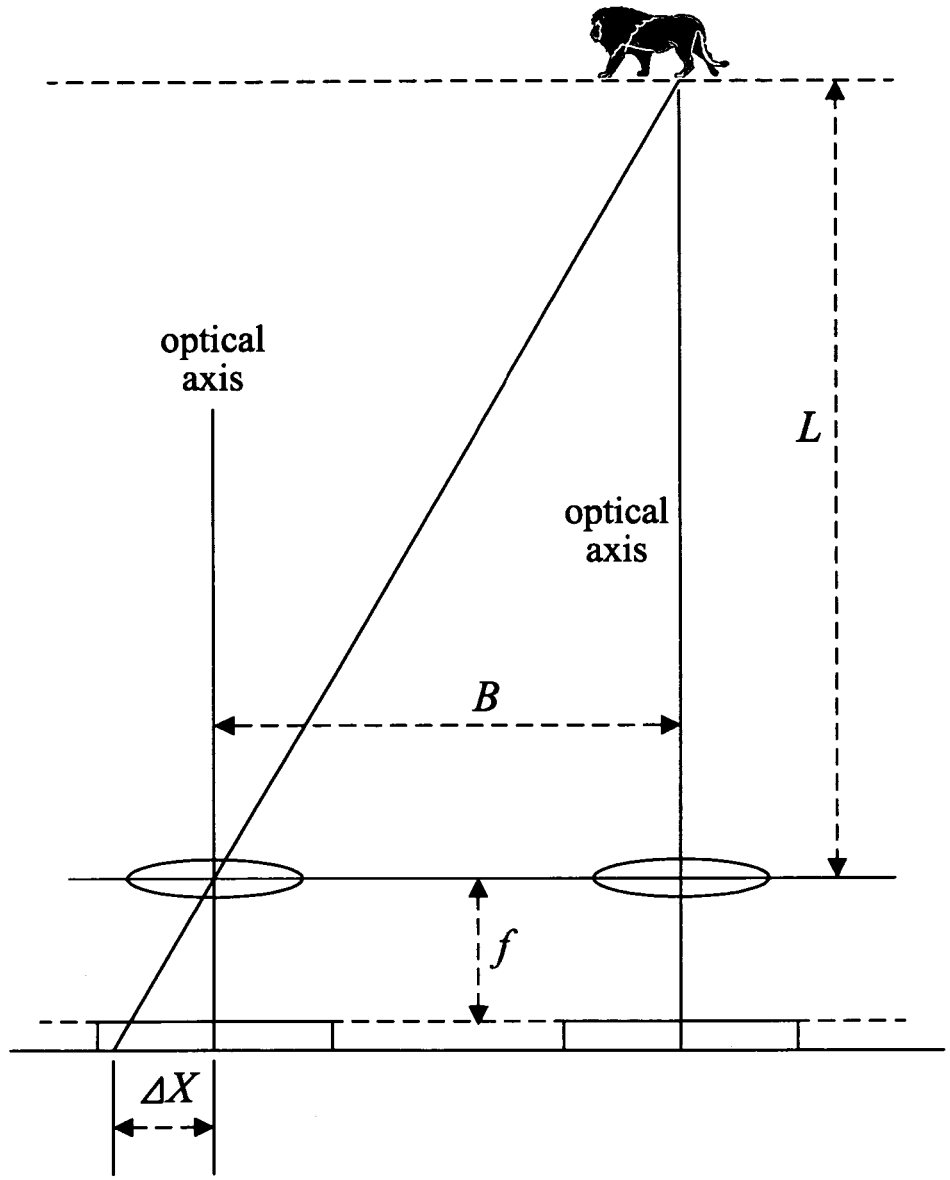
FIG. 14 illustrates the use of a second imaging source.

Depth to the projection surface is useful in estimating the relative projection surface orientation. With the depth to one or more points on the projection surface calculated, $f_P$ may be calculated. The relative angles may be computed from the depth of the test patterns relative to the projector. While the use of a single sensor coupled with the projector optics is acceptable, it is difficult to obtain an accurate estimate of the distance from the projector to the display surface. In order to obtain a more accurate estimate of the distance from the projector to the display surface a depth-sensing device (e.g., a stereo camera), apart from the projector optics, may be used. In order to reduce expense, the depth sensing device may be a one-dimensional imaging sensor pair, if desired (such as illustrated in FIG. 14). As illustrated in FIG. 14, one sensor may be used to sense horizontal angular deviation and another sensor to measure vertical angular deviation. The depth estimation may likewise be used to increase the accuracy of the projection screen detection module. Also, the system may place a constraint on the detected corners of the projection screen that they are co-planar, which is normally the case, in order to make the depth estimation more robust."

In another embodiment the imaging may use the projector optics (e.g., the projector lens) together with one or more other imaging devices. Preferably, the sensor is a single 2-dimensional camera. The imaging devices may be maintained in a fixed location with respect to the projector, and are preferably integral therewith. However, it has been determined that if the projector optics are adjusted in some manner during use, then the system needs to be re-calibrated for a new set of parameters to compensate for the zooming and/or focusing and/or lens shifting. To overcome this limitation, the prevent inventors determined that the system may pre-calibrate the optics of the projector so that the new parameters of the projector optics can be computed from the lens control parameters, as the lens is moved during zooming and/or focusing and/or lens shifting. The pre-calibration may include modeling the variations in the optical parameters as a function of one or more of the lens control parameters, so that the on-line re-calibration can be done automatically. The calibration may include calculations from pre-calibrations or otherwise a look-up table.

The system may use one or more, single dimension or multiple dimension, imaging devices together with a known landmark as a reference in computing $f_P$. Then the transform Q may be calculated between the projector panel and the camera image, after detecting a test pattern. In addition, the system may compute the transform $t_C$ between the projection plane and the camera image, which then permits solving for $f_P$ by using the equation: $Q=t_C f_P$.

The preferred system for using landmark detection is a single camera integrated with the projector and maintained in a close fixed relationship with respect to the projection lens. The landmark may be any item, such as the projection screen. In addition, the system may correct up to an unknown aspect ratio. The system may use an interactive technique to provide a suitable aspect ratio, if desired. Alternatively, the projector may include a list of common aspect ratios in the projector from the user to select from. In addition, there may be a user selectable default ratio that may be used so that the system does not require user selection of the aspect ratio each time during auto-calibration.

Figures 15, 16:
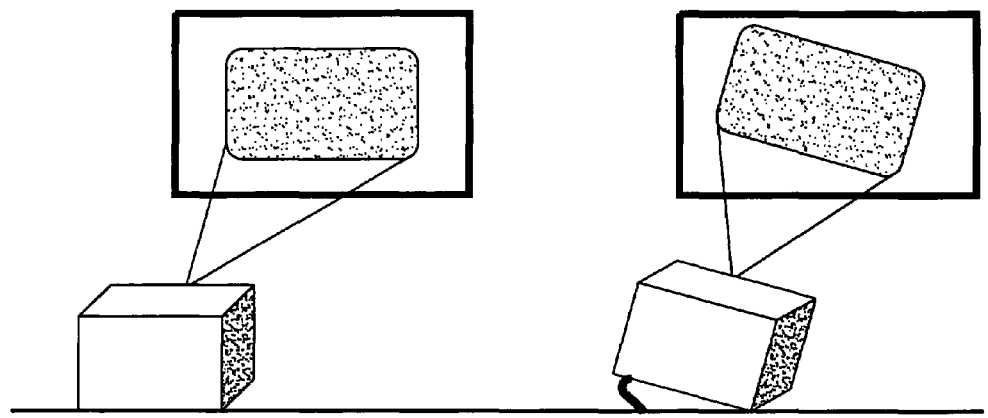
FIG. 15 shows projection roll.
FIG. 16 shows corrected projection roll.

Referring to FIG. 15, after keystone correction the projected image may be rectangular but it is not necessarily properly oriented with respect to the user, which typically desires the top and bottom edges to be horizontal, and the right and left edges to be vertical. In some embodiments the detected projection screen, or parts thereof, may be used as a basis to correct for projection roll so that the projector will be aligned with the real world, as illustrated in FIG. 16.

Figure 24:
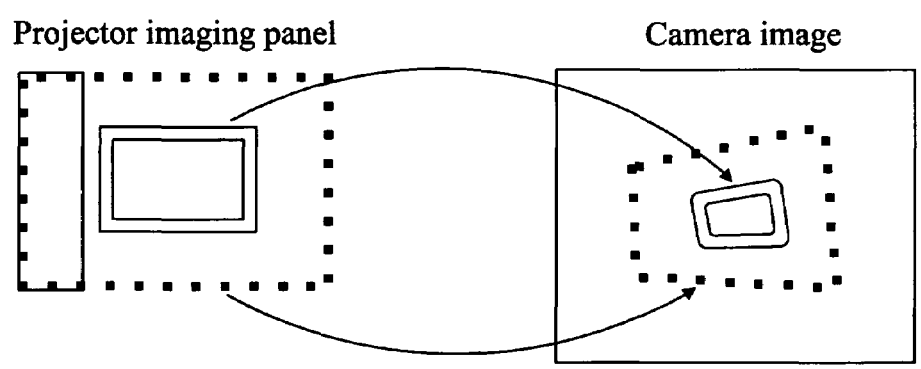
FIG. 24 illustrates a projector imaging panel and camera image.

In some cases the projector is not free to move on its own, and therefore the user typically should position the projector roughly facing the screen. If the user directs the projector too much off the screen, then the camera may not see a significant part of the screen and thus will not be able to initialize the auto-setting. In addition, since the projector cannot freely move, even if screen can be detected under such condition, the usable resolution of the projector will be greatly reduced in order to keep the projection on the screen. An example of such extreme positioning is illustrated in FIG. 24.

Figure 25:
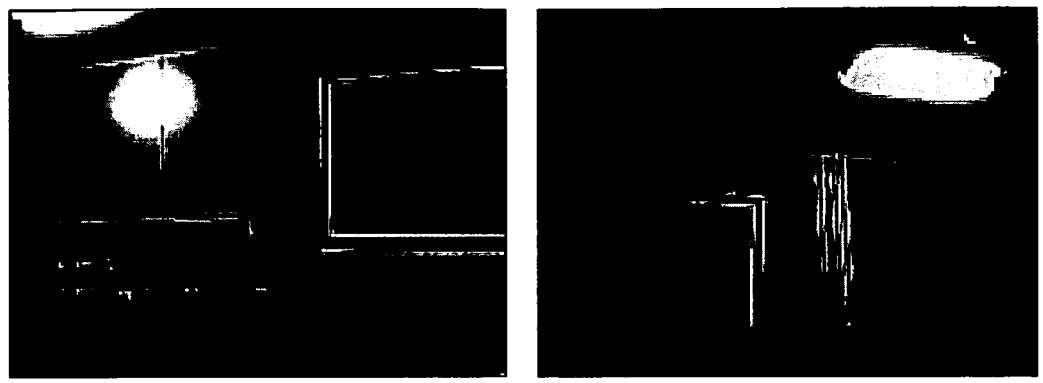
FIG. 25 illustrates extreme projector misalignment.

To assist the user in positioning and/or aligning the projector toward the appropriate operating range of the projector for the auto-setting mode or a manual mode, an image may be projected. The projected image should indicate to the user the desirability of locating the image on the screen, such as by movement of the projector. Referring to FIG. 25, when the user turns on the projector, the user selects the mode for assisting in setup, or otherwise the auto-setting mode fails to properly make adjustments, the system projects a smiley face and a message suggesting to the user to located the smiley face onto the screen. Since the camera and the projector are in a fixed relationship with respect to each other, the system may compute before-hand the rough location of the smiley face in the camera domain. Therefore, the system may deduce an initial point in the camera domain which is guaranteed by the user to be on the screen. Based upon this deduction the rest of the set up techniques may be applied, as desired. It is to be understood that other graphics may likewise be used and/or other textual messages. In most cases, an image or text should be presented that indicates to the user the desirability of modifying the projection so that it is on the projection screen.

With the "Smile Face" technique, the two major components of the system (screen detection and projection detection) have a greater likelihood to have a good initial starting point. For example, if the system considers that a the smiley face is on the screen, and the system includes a test pattern so that the smiley face is in the general central region of the projector picture, then the system may presume that the center of the camera image is on the screen. In other words, the system may presume that the region occupied by the "Smile Face" is on the screen and that the projected patterns which overlays or is proximate the region occupied by the "Smile Face" (which may be removed) is likewise is on the screen. After removing the smiley face or otherwise while the smiley face continues to be presented, a test pattern may be projected to perform the auto-set up features, described herein.

Figure 26:
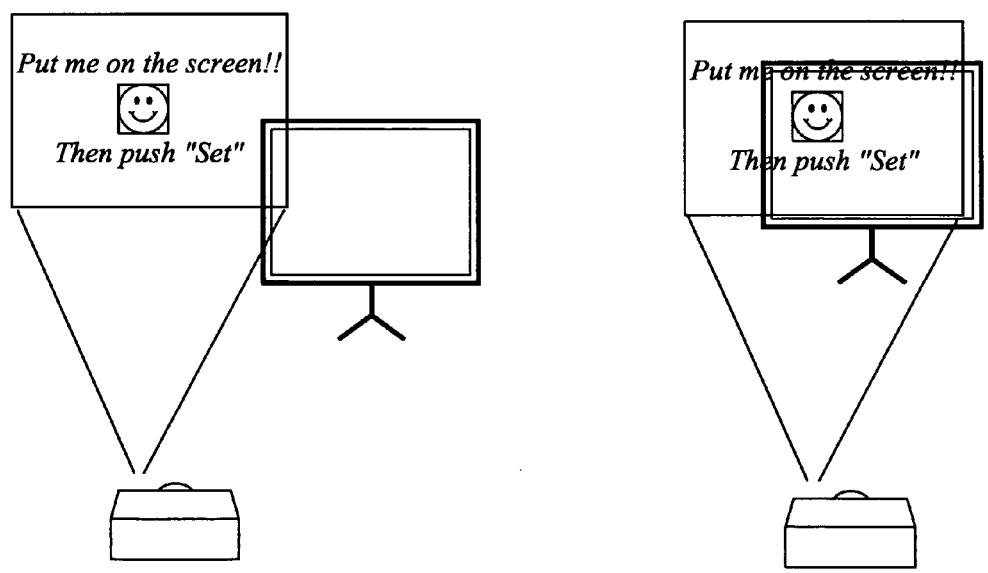
FIG. 26 illustrates a "smiley face" technique.

A user may place the projector at any angular position and distance with respect to a screen. Therefore, it is desired that the camera be able to image a larger area than the projector optics projects so that the camera can still see the screen and do detection even under a large off-the-center positioning angle. Thus a camera with a "wide" field of view is desired. Unfortunately, some wide-angle cameras, especially low cost wide-angle cameras, frequently have severe lens distortion. Radial distortion is one type significant lens distortion, which refers to the effect that the magnification of the lens is not uniform from the lens center to the surrounding rim. In the image domain, this results in curved lines even if the physical line is straight. FIG. 26 illustrates an example of radial distortion.

To alleviate such radial distortion, and other potential distortions resulting from the wide-angle lens, the imaging characteristics of the camera lens are measured and modeled in some manner. Then the projection system, when a coordinate in the camera domain is used, it is first passed through a lens distortion correction model, and the obtained value is then used in the various computation modules.

With a screen detection techniques described herein the projection system may automatically center the projection by moving the projector or the projector lens. For example, if the projection is to the left of the screen, the screen detection algorithm can detect that and output a set of control parameters that cause the projector/lens to be shifted towards right-hand side, and so on and so forth. In one embodiment, the control parameters are computed from the distance between the mass centers of the screen and the projected rectangle.

The same principle may be used to achieve automatic zooming: if the projection is bigger than the detected screen, then the projector will zoom in (making the projection smaller); if the projection is smaller than the screen, then the projector will zoom out (making the projection bigger).

Note that, if a stereoscopic technique is used for keystone reduction, then there may be no absolute guarantee that the corrected projection is aligned in the vertical direction, although the projection will be rectangular. In this situation, while screen detection may not be necessary for keystone correction, the screen detection module and the detected screen may be used to adjust the projector roll so that the projection will be vertically aligned as illustrated in FIGS. 15 and 16.

It is noted that between some operations of the set up of the projector the user does not separately have to initiate additional functions. In this manner, the user may initiate a single function that performs more than one operation. Also, the user may not have to separately perform different functions, such as pressing an auto-zoom button, then pressing a keystoning button. It is also noted that any transformations may be a single operation or the result of a series of operations and/or computations. It is also noted that the processing of the keystoning effects is performed all within the projector itself, as opposed to using a separate personal computer, which speeds up the processing and simplifies connectivity issues for the user. Also, one or more of the other functions may likewise be implemented within the projector, if desired.

All references cited herein are hereby incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for keystoning in a projector, comprising:
   (a) projecting an image from a lens of said projector;
   (b) using an imaging device to sense said image projected by said projector;
   (c) determining a transformation to adjust the keystoning of an image projected from said projector;
   (d) modifying said image projected from said projector based upon said transformation;
   (e) projecting said modified image from said projector, wherein said imaging device and said projector are within 5 inches of each other.

2. The method of claim 1 wherein said imaging device and said lens are maintained in a fixed relationship with respect to each other.

3. The method of claim 1 wherein said imaging device is integral with said projector.

4. The method of claim 1 wherein said imaging device and said lens are within 3 inches of each other.

* * * * *